United States Patent [19]
Eckersley et al.

[11] 3,948,499
[45] Apr. 6, 1976

[54] IMPACT ABSORPTION DEVICES AND VALVE STRUCTURE

[75] Inventors: John Stanley Eckersley, Pudsey; Peter Noble, Huddersfield, both of England

[73] Assignee: Jonas Woodhead Limited, Leeds, England

[22] Filed: Sept. 6, 1974

[21] Appl. No.: 504,671

[30] Foreign Application Priority Data
Sept. 7, 1973 United Kingdom............ 42197/73

[52] U.S. Cl............. 267/65 R; 137/494; 188/282; 188/315; 188/322; 267/34; 293/DIG. 2
[51] Int. Cl.²........................................ F16F 9/10
[58] Field of Search......... 188/280, 282, 315, 317, 188/320, 322, 313, 318; 267/65 R, 34; 293/DIG. 2; 213/43; 137/494

[56] References Cited
UNITED STATES PATENTS

| | | | |
|---|---|---|---|
| 2,537,491 | 1/1951 | Thornhill | 267/65 |
| 2,825,427 | 2/1958 | Steibel | 188/282 |
| 3,534,870 | 10/1970 | Daugherty, Jr. | 188/282 X |
| 3,570,635 | 3/1971 | Takagi | 188/280 |

FOREIGN PATENTS OR APPLICATIONS
699,896  11/1953  United Kingdom............ 188/282

*Primary Examiner*—George E. A. Halvosa

[57] ABSTRACT

An impact absorber, particularly for automobile fenders, comprising a cylinder, a piston on one end of a piston rod and slidable in the cylinder, an annular partition slidable on the piston rod, and a valve carried by the piston and allowing, on compression of the impact absorber, flow from the chamber beyond the piston to the annular chamber between the piston and the partition. The valve is biased in the closing direction by a spring and has a valve member with opposed differential areas which are exposed to the pressure in the said chamber and are selected to bias the valve in the opening direction.

5 Claims, 2 Drawing Figures

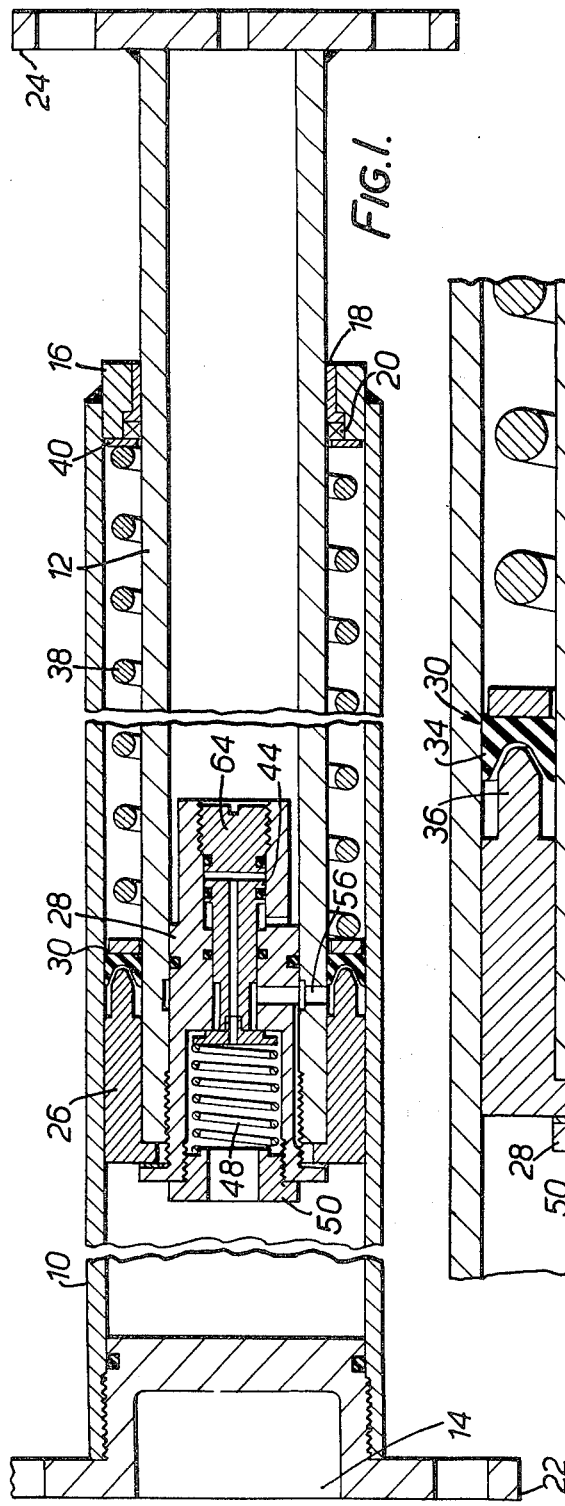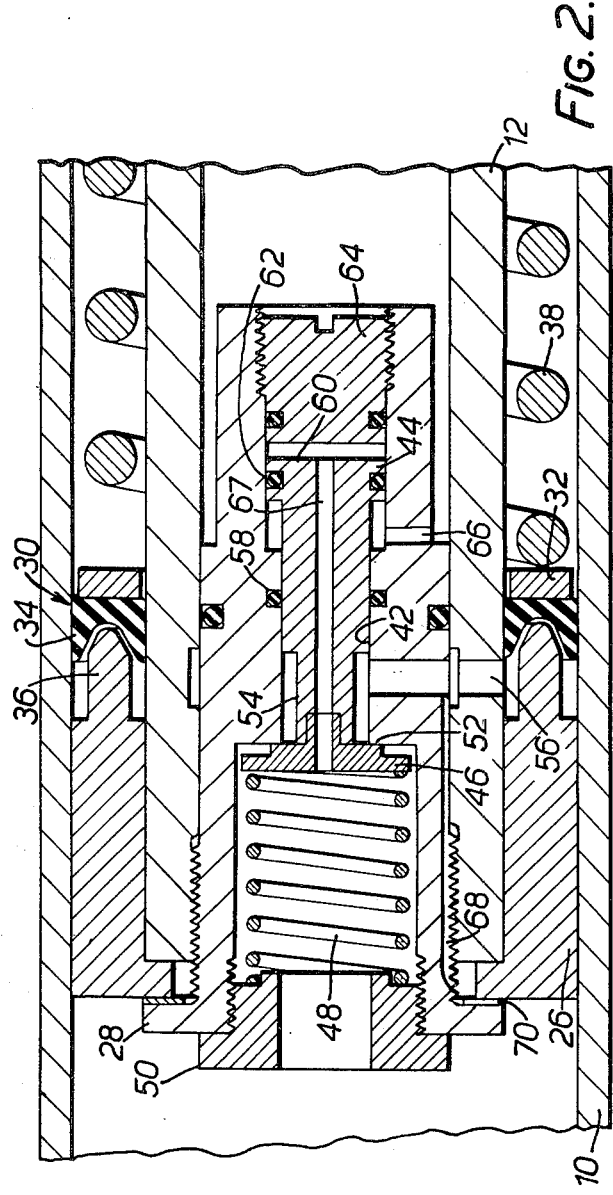

IMPACT ABSORPTION DEVICES AND VALVE STRUCTURE

BACKGROUND OF THE INVENTION

This invention relates to impact absorbers.

One application for impact absorbers is to support the bumpers of a road vehicle from the body of the vehicle. The impact absorber is so arranged that if the bumper of the vehicle sustains an impact, it can yield against a resisting force provided by the impact absorber. In this way some, at least, of the impact energy is absorbed by the impact absorber, and damage to the vehicle is minimized, or even prevented entirely at reasonably low impact speeds.

An impact absorber has already been proposed which comprises a cylinder, a piston slidable within the cylinder, a valve member arranged to cooperate with a seat in a valve housing to control fluid flow out of the cylinder working chamber on one side of the piston, and means biasing the valve member on to the seat. The two sides of the piston are connected by passages through the piston which are normally closed by an annular disc biased against the piston by its own resilience or by one or more spring discs. It is desirable in an impact absorber for the valve to remain closed until a high pressure has been built up and it is desirable for the flow passage controlled by the valve to have a large cross-section to provide the necessary characteristic. To meet these requirements it is necessary to provide a very strong spring. However, it is also desirable, in an impact absorber, for the valve to open fully with only a small increase in pressure above that needed to open it at all; this implies a relatively low spring rate, which is difficult to achieve in combination with a large initial spring force in a compact arrangement.

SUMMARY OF THE INVENTION

It is an object of the invention, to provide an impact absorber which minimizes these problems.

The present invention provides an impact absorber comprising: a cylinder; a piston slidable within said cylinder, one side of said piston bounding a working chamber in said cylinder; and a valve arranged to control fluid flow out of said working chamber, said valve comprising a valve housing, a valve seat in said housing, a valve member cooperating with said valve seat, and means biasing said valve member on to said seat, said valve member having opposed surfaces which are exposed to the pressure in said working chamber, the areas of said surfaces being different so that the pressure exerts a net pressure force tending to lift said valve member from said seat, whereby said valve will open when the pressure reaches a predetermined value.

With the partially balanced valve member provided by the invention, the force required from the biasing means, for example a coil spring, is quite low and a spring of the required strength and with a low spring rate can easily be accommodated in a small space.

Such an impact absorber will develop a substantially constant force throughout its stroke. This is particularly useful where the impact absorber is used to support the bumper of a road vehicle. Since there is a limit to the load that can be sustained by the vehicle body, and also to the deceleration that can be tolerated by the passengers, it is desirable to keep the resisting force constant, to obtain the maximum energy absorption for a given stroke length and given maximum resisting force.

The fluid which flows out of the said working chamber when the impact absorber is under load may pass to a storage chamber outside the cylinder whence it is returned when load on the impact absorber is removed. Preferably, however, the valve controls fluid flow between opposite sides of the piston. In either case, the valve may be situated at a fixed location outside or in the wall of the cylinder but preferably the valve housing is attached to the piston.

In a preferred arrangement in which the piston is carried on one end of a piston rod, the valve leads to an annular chamber bounded at one end by the piston and at the other by an annular partition which is slidable on the piston rod and which is of resilient material and is of U-shaped cross-section to afford lip seals engaging the inner surface of the cylinder and the outer surface of the piston rod. This is a simple and economic construction avoiding the need for separate seals such as O-rings on the inner and outer circumferences of the partition.

In a preferred construction, the valve housing is carried by the piston, and has a bore in which the valve member is slidable. The seat is formed by a shoulder in the bore, and the valve member has a valve disc arranged for cooperation with the seat. One side of the valve disc, preferably that remote from the seat, is exposed to the pressure on the one side of the piston, and the valve member also includes a cylindrical portion sealingly slidable in the bore of the valve housing and having its side opposite to the said one side of the valve disc also exposed to the said pressure.

The invention may be carried into practice in various ways but many important objects and advantages of the invention will be more fully appreciated from the following description with reference to the accompanying drawings of a preferred embodiment of the invention.

BRIEF DESCRIPTION OF THE DRAWINGS

FIG. 1 is a longitudinal section through an impact absorber; and

FIG. 2 is a detailed view showing the valve arrangement of the impact absorber of FIG 1.

DESCRIPTION OF THE PREFERRED EMBODIMENT

The impact absorber shown in FIG. 1 consists of a cylinder 10 within which a hollow ram 12 is slidably mounted. One end of the cylinder 10 is closed by a plug 14, which is screwed into the end of the cylinder, while the other end is closed by a ring 16, which is welded in place, and through which the ram 12 projects. The ring 16 contains a plastics bearing bush 18 which provides a bearing surface for the ram 12, and a felt ring type seal 20.

The plug 14 has a flange 22 by which it can be bolted to the frame of a vehicle. The ram 12 has a similar flange 24 welded to its projecting end; the vehicle bumper is bolted to this flange. It is possible for a flange to be provided on the cylinder 10 or the ring 16 instead of on the plug 14, for bolting to the vehicle frame; this may be desirable to reduce the projection of the impact absorber from the vehicle. It is also possible, where the flange is provided on the plug 14, to reverse the impact absorber end for end.

The inner end of the ram 12 carries a piston 26, which is a close fit in the bore of the cylinder 10, and forms the main working piston of the impact absorber. The main piston 26 is secured to the ram 12 by a valve housing 28 which is screwed into the end of the ram, and has a flange which bears against the main piston to hold it in place.

The annular space between the cylinder 10 and the ram 12 is divided by a floating piston 30. The floating piston consists of a ring 32 and a U-section seal 34 which is supported by the ring. The main piston 26 has an annular portion 36 which projects to the right and forms an abutment limiting the leftward movement of the floating piston 30. The portion 36 is so shaped that it only touches the centre of the seal 34. the sealing lips are therefore not disturbed The floating piston 30 is biased to the left by a helical precompressed compression spring 38, which bears at its other end, through a washer 40, on the ring 16. The washer 40 also holds the seal 20 in place.

The space defined by the cylinder 10, the plug 14, the floating piston 30 and the ram 12 is filled with oil. If the impact absorber is to be compressed from its normal position (as shown in FIG. 1), oil must flow from the left of the main piston to the right. This flow is controlled by a valve arrangement which will now be described.

A stepped axial bore 42 is formed in the valve housing 28, and contains a valve member 44. The left-hand end (as seen in FIG. 1) of the valve member 44 carries a valve disc 46, against which a compression spring 48 bears. The other end of the spring 48 bears against a bush 50 which is screwed into the left-hand end (as seen in FIG. 1) of the bore 42. Thus the valve disc 46 is biased against a shoulder 52 in the bore 42. If the valve disc should leave the shoulder 52, fluid flow is possible from the space to the left of the main piston 26, between the valve disc 46 and the shoulder 52, along a reduced-diameter portion 54 of the valve member 44, and through a radial passage 56 in the valve housing 28 and the ram 12 to the space to the right of the main piston 26.

To the right of the reduced-diameter portion 54, the valve member 44 has a portion which is a close fit in the part of the bore 42 to the right of the shoulder 52; an O-ring 58 is provided in this part of the bore to form a seal with the valve member 44. Further still to the right, the bore 42 has an enlarged portion, and the right-hand end of the valve member 44 carries an integral piston 60 which slides in this enlarged portion of the bore; the piston carries an O-ring seal 62. The right-hand end of the bore 42 is closed by a plug 64 which is screwed into place.

The space which is defined by the valve housing 28, the valve member 44, and the two O-rings 58 and 62 is vented to atmosphere through a radial passage 66 in the valve housing, the interior of the ram 12, and a hole in the centre of the flange 24.

The space between the plug 64 and the valve member 44 communicates with the space to the left of the main piston 26 through a small axial hole 67 in the valve member 44.

In operation, the normal state of the impact absorber is that shown in FIG. 1. Compression of the absorber will be resisted by the oil to the left of the main piston 26. However, the piston 60 has a larger diameter than the portion of the valve disc 46 in contact with the shoulder 52, and therefore the oil exerts a net pressure force to the left on the valve member 44 which is normally overcome by the force of the spring 48. If the impact absorber is subjected to a sufficiently large compressive force, the pressure force will overcome the spring force and the valve disc 46 will leave the shoulder 52, and the ram 12 will be able to move to the left, displacing oil through the valve to the space between itself and the cylinder 10 as it does so. To accommodate the oil displaced into this space, the floating piston 30 moves to the right, against the spring 38. Thus the oil in the space to the right of the main piston is under a pressure determined by the strength of the spring 38, while the oil to the left of the main piston is under a pressure which is higher by an amount determined by the valve arrangement. The force opposing compression of the impact absorber is the difference between the force exerted over the whole area of the piston by the latter pressure and the force exerted on the area of the piston exposed to the annular space between the ram 12 and the cylinder 10 by the former pressure.

The diameters of the valve disc 46 and the piston 60 are only slightly different, so that a high pressure is needed to exert sufficient force on the valve member to open the valve.

When the force causing compression of the impact absorber is removed, the absorber must recuperate. To allow this, oil must flow from the right of the main piston to the left. This flow cannot take place through the valve arrangement, and therefore a bleed passage is provided.

The bleed passage is formed by a groove 68 in the outer surface of the valve housing 28 and a notched metering disc 70, which is gripped between the main piston 26 and the flange of the valve housing 28. Since there is no valve in the bleed passage, oil can flow through it in both directions. The size of the bleed passage is such that this flow is so small that it hardly affects the compression characteristics of the impact absorber. When compressive forces are removed from the absorber, the pressure produced in the oil to the right of the main piston 26 by the spring 38 acting on the floating piston 30 causes oil to flow through the bleed passage, and the absorber recuperates. The speed of recuperation may typically be about one-tenth of the speed of compression; this is sufficient to ensure that the impact absorber will be able to absorb multiple impacts of the type that occur in a multiple collision of road vehicles.

If the impact absorber is subjected to a compressive force, there is a tendency for flow to occur through the bleed passage, even through the force is too small to cause the valve to open. However, because the oil in the absorber is pressurised by the spring 38 acting on the floating piston 30, no movement can occur until the compressive force is sufficient to balance the force due to the oil pressure acting over the cross-sectional area of the ram 12. In this way the spring 38 provides a force threshold below which no movement will occur. When the impact absorber is fitted to a vehicle, the force threshold allows the vehicle bumper to be used to push the vehicle or to push other vehicles without any compression occurring.

If the impact absorber is used to support a vehicle bumper, and the bumper is used as an attachment point for towing, the impact absorber will be subjected to a tensile force. This force will be transmitted from the ram 12 to the cylinder 10 by way of the main piston 26, the floating piston 30, and the spring 38. Thus the spring 38 can act to cushion any shock loads which may occur during towing.

The spring 38 has a low rate, but is under a substantial compressive force in the normal position of the absorber, to provide the compressive and tensile threshold forces. Other springs than a helical spring could be used. One alternative is a stack of dished spring washers; another is a pneumatic spring, formed by providing a pressure seal in the ring 16 and replacing the seal 34 by one which will seal against pressure on either side.

It will be appreciated that other arrangements of the floating piston 30 and the spring 38 are possible. For example, the piston 30 could be replaced by an ordinary piston sliding in the bore of the ram 12, with a spring biasing it towards the left. Corresponding changes would then be needed in the valve assembly, to make the passage 66 vent to atmosphere, possibly in the space between the ram 12 and the cylinder 10, and to make the passage 56 communicate with the bore of the ram 12.

It is also possible to dispense with the spring 38, or replace it by a very light spring. In this case the tensile and compressive force thresholds would be provided by a spring forming part of the equipment in which the impact absorber is incorporated. For example, where the impact absorber is used to support the bumper of a road vehicle a spring would also be connected between the bumper and the vehicle chassis.

What we claim as our invention and desire to secure by Letters Patent is:

1. An impact absorber comprising: a cylinder having a closed end; a working piston slidable within said cylinder, one side of said piston bounding a working chamber in said cylinder, said working chamber also being bounded by said closed end of said cylinder; a ram attached to the side of said piston remote from said working chamber and projecting from the opposite end of said cylinder, aid ram having a diameter less than that of said piston to define an annular space between said ram and said cylinder; an axially-movable annular piston slidable in said annular space to define a further working chamber, said further working chamber being located between said working piston and said annular piston; a spring biasing said annular piston toward said working piston; and a valve in said working piston arranged to control fluid flow out of said first-mentioned working chamber to said further working chamber, said valve comprising a valve housing, a valve guide bore formed in said housing and having an end opening into said first mentioned working chamber, a first cylindrical portion having a first diameter extending from said end, and a second cylindrical portion of a second diameter greater than said first diameter on the side of said first cylindrical portion remote from said end of said bore, a valve seat on said housing and encircling said end of said bore and facing said first mentioned working chamber, a valve spool member guided in said guide bore in sealing contact with said first and second cylindrical portions of said bore and having a valve head for seating against said valve seat, a spring biasing said valve member to tend to maintain said valve head against said valve seat, and a passage providing fluid communication between said first-mentioned working chamber and the part of said bore on the side of said valve member remote from said first-mentioned working chamber.

2. An impact absorber according to claim 1 in which said passage providing fluid communication between said first-mentioned working chamber and said part of said bore is provided by an axial bore in said valve spool member.

3. An impact absorber according to claim 2 in which a vent to atmosphere is provided from said valve guide bore between said sealing contact of said valve spool member with said bore in said first cylindrical portion and said sealing contact in said second cylindrical portion.

4. An impact absorber according to claim 1 which includes a bleed passage between said first-mentioned working chamber and said further working chamber.

5. Am impact absorber comprising: a cylinder; a piston slidable within said cylinder, one side of said piston bounding a working chamber in said cylinder; and a valve arranged to control fluid flow out of said working chamber, said valve comprising a valve housing, a valve guide bore formed in said housing and having an end opening into said working chamber, a first cylindrical portion having a first diameter extending from said end, and a second cylindrical portion of a second diameter greater than said first diameter on the side of said first cylindrical portion remote from said end of said bore, a valve seat on said housing and encircling said end of said bore and facing said working chamber, a valve spool member guided in said guide bore in sealing contact with said first and second cylindrical portions of said bore and having a valve head for sealing against said valve seat, a spring biasing said valve member to tend to maintain said valve head against said valve seat, and a passage providing fluid communication between said working chamber and the part of said bore on the side of said valve member remote from said working chamber.

* * * * *